United States Patent [19]

Nakamoto

[11] Patent Number: 5,621,911
[45] Date of Patent: Apr. 15, 1997

[54] CACHE MEMORY WITH AN UPDATABLE ADDRESS STORING UNIT

[75] Inventor: Tsukuo Nakamoto, Itami, Japan

[73] Assignee: Mitsubishi Denki Kabushiki Kaisha, Tokyo, Japan

[21] Appl. No.: 304,182

[22] Filed: Sep. 12, 1994

[30] Foreign Application Priority Data

Sep. 13, 1993 [JP] Japan .................................. 5-227100

[51] Int. Cl.⁶ ................................................. G06F 12/08
[52] U.S. Cl. ................................................. 395/445
[58] Field of Search ................................. 395/400, 425; 364/264.4, 243.41, 243.4

[56] References Cited

U.S. PATENT DOCUMENTS

| | | | |
|---|---|---|---|
| 4,942,520 | 7/1990 | Langendorf | 364/200 |
| 5,014,195 | 5/1991 | Farrell et al. | 364/200 |
| 5,067,078 | 11/1991 | Talgan et al. | 395/400 |
| 5,091,851 | 2/1992 | Shelton et al. | 395/425 |
| 5,136,700 | 8/1992 | Thacker | 395/400 |
| 5,150,471 | 9/1992 | Tipon et al. | 395/400 |
| 5,155,832 | 10/1992 | Hunt | 395/425 |

FOREIGN PATENT DOCUMENTS 2161546  12/1963  Japan .

*Primary Examiner*—Kevin J. Teska
*Assistant Examiner*—Stephen J. Walder, Jr.
*Attorney, Agent, or Firm*—Lowe, Price, LeBlanc & Becker

[57] ABSTRACT

A cache memory is provided with an address information storing unit for storing a register value register value, for example, contents of a program counter PC, a stack pointer SP or the like. When the cache memory is built in a microprocessor having a function of accessing to an external memory with a value of the register used for accessing to an external memory, the address information storing unit is updated by the high-order digits of the aforementioned register such as the stack pointer SP, the program counter PC or the like.

9 Claims, 15 Drawing Sheets

FIG. 2
PRIOR ART

ENTRY No.

| | 2 | 4 | 3 |
|---|---|---|---|
| 1 | 0000 | 1 | AA AA AA AA |
| 2 | xxxx | 0 | XX XX XX XX |
| ... | ... | ... | ... |
| 256 | xxxx | 0 | XX XX XX XX |

FIG. 3
PRIOR ART

| ENTRY No. | 2 | 4 | 3 |
|---|---|---|---|
| 1 | 0000 | 1 | AA AA AA AA |
| 2 | 0000 | 1 | BB BB BB BB |
| . | xxxx | 0 | XX XX XX XX |
| . | . | . | . |
| . | . | . | . |
| . | . | . | . |
| . | . | . | . |
| . | . | . | . |
| 256 | xxxx | 0 | XX XX XX XX |

FIG. 6

```
ADD.
000000      MOV R1,R0
              DEC R1
              ⋮
00000F
000100        ⋮
              ⋮
00010E      BNE 0001 0
00010F
```

FIG. 8

```
             x:
push  a  }·····101    mov  sp-1,c  }·····103
push  b               add  sp-2,c
bsr   x  }·····102    rts          }·····104
pop   b  }·····105
pop   a
```

CACHE MEMORY WITH AN UPDATABLE ADDRESS STORING UNIT

BACKGROUND OF THE INVENTION

1. Field of the Invention

The present invention relates to a cache memory built in a microprocessor and, in particular, to a cache memory intended for simplification of its constitution and downsizing the hardware as well as for improvement of the hit ratio during loop processing.

2. Description of the Related Art

An example of a conventional cache memory built in a microprocessor, with a direct mapping system, for example, will be described below with reference to a block diagram of FIG. 1.

In the conventional cache memory shown in FIG. 1, an access address from the microprocessor has a 24-bit width, from bit 0 to bit 23, and the data is accessed in units of 32 bits.

In FIG. 1, reference numeral 1 represents an access address outputted from the microprocessor (not shown). The access address indicates a stored address in an external memory (not shown) of a data (instruction data or operand data) which is to be fetched by microprocessor.

By the way, the access address 1 has 24-bit width as mentioned above, of which the lower 8 bits are outputted to an address decoder 5 and the higher 16 bits are outputted to a comparator 6 respectively.

Reference numeral 2 represents an address information storing unit, capable of storing 256 units of the higher 16 bits of the access address 1 in this embodiment as described below.

Reference numeral 3 represents a data storing unit. The data storing unit 3 is a memory of 32-bit width capable of registering 256 pieces of data read/write accessed from the external memory (not shown) by a microprocessor in this embodiment as described below.

The address information storing unit 2 and the data storing unit 3 is composed of 256 entries in No. 1 to No. 256 determined uniquely by decoding the lower 8 bits of the access address 1. Accordingly, one entry of the cache memory shown in FIG. 1 is composed of a 16-bit region of the address information storing unit 2, a 32-bit region of the data storing unit 3 and 1 bit of valid bit storing unit 4 described below.

The valid bit storing unit 4 is composed of valid bits, each which corresponds to each entry of the address information storing unit 2 and data storing unit 3.

When each valid bit of the valid bit storing unit 4 is set to "1", it means that the data stored in an entry of the data storing unit 3 corresponding to the valid bit is valid, and when it is reset to "0", it means that the stored data is invalid.

Reference numeral 5 represents an address decoder. The address decoder 5, as aforementioned, specifies uniquely one entry of the 256 entries according to the decoding result of the lower 8 bits of the access address 1.

Reference numeral 6 represents a comparator, which compares the higher 16 bits of the access address 1 with the address information stored in the entry of the address information storing unit 2 specified by the address decoder 5. Then, when the valid bits of the valid bit storing unit 4 corresponding to the entry No. of the decoding result by the address decoder 5 is valid and comparison results agrees, the comparator 6 asserts a hit signal HIT.

As described below in detail, when the cache memory built in the microprocessor is hit (i.e. when the comparison result by the comparator 6 agrees and the data is valid) in read accessing by the microprocessor, the hit signal HIT from the comparator 6 is asserted and data is read from the corresponding entry of the data storing unit 3. When the comparison result of the comparator 6 do not agree, the value of the address information storing unit 2 is rewritten to the value of the higher 16 bits of the access address 1 newly accessed.

The reading operation of the conventional cache memory shown in FIG. 1 will be explained below.

When the system as a whole is reset, all valid bits of the valid bit storing unit 4 are reset.

From this state, the operation when the cache memory makes a read miss with regard to read access from the microprocessor is as described below.

When read access with regard to an address "000000h (h indicates hexadecimal notation)" is started, the cache memory operates as follows.

The address decoder 5 decodes the lower 8 bits "00h" in the access address 1. In this case, the No. 1 entry is obtained as a decoding result of "00h".

Then, the address stored in the No. 1 entry of the address information storing unit 2 is compared with the higher 16 bits of the access address 1 by the comparator 6 and simultaneously set/reset of the valid bit of No. 1 entry of the valid bit storing unit 4 is checked.

When the comparison result by the comparator 6 agrees and also the valid bit of the corresponding entry of the valid bit memory 4 is valid, it is judged as hit and the hit signal HIT is asserted. That is, data corresponding to the access address 1 is judged as already registered in the cache memory, specifically in the data storing unit 3.

However, since immediately after resetting of the system as a whole, valid bit of No. 1 entry of the valid bit storing unit 4 is reset, it is judged that the data is not registered (cache miss).

When such a cache miss has occurred, read access by the microprocessor is done to the external memory.

Now, for example, it is supposed that the microprocessor has read accessed the data "AAAAAAAh" of the address "000000h". In this case, the value of the higher 16 bits "0000h" is stored in No. 1 entry of the address information storing unit 2 corresponding to the entry No. 1 obtained by decoding the lower 8 bits of the access address 1 by means of the address decoder 5, the data "AAAAAAAh" taken into the microprocessor by the read access is stored in No. 1 entry of the data storing unit 3, and the valid bit of No. 1 entry of the valid bit storing unit 4 is set to "1".

Thus, the data "AAAAAAAh" of the address "000000h" is registered in No. 1 entry of the cache memory.

FIG. 2 is a schematic diagram showing stored contents of the address information storing unit 2, data storing unit 3 and valid bit storing unit 4 after the microprocessor has accessed the address "000000h".

Thus, when the cache memory makes cache miss, the data read accessed from the external memory is registered in the cache memory.

Next, operation when the microprocessor has again accessed the data already registered in the cache memory will be explained.

When the microprocessor has again accessed to the address "00000h", the address "0000h" stored in No. 1 entry of the address information storing unit 2 is compared with the higher 16 bits of the access address 1 by the comparator 6. Simultaneously, set/reset of the valid bit of No. 1 entry of the valid bit storing unit 4 is checked. When the comparison result by the comparator 6 agrees and the valid bit is valid, it is judged that the data of the access address 1 is registered and the hit signal HIT is asserted.

Under the condition shown in FIG. 2, the address stored in No. 1 entry of the address information storing unit 2 agrees, being "0000h", and valid bit of No. 1 entry of the valid bit storing unit 4, too, is set to "1" (valid), hence it is judged that the access data is already registered in No. 1 entry of the cache memory. As a result, the data "AAAAAAAh" stored in No. 1 entry of the data storing unit 3 is outputted to the microprocessor.

Operation when a read miss has occurred once again will be explained.

Now, taken as example is the case where the access address 1 from the microprocessor is "000001h" with its higher 16 bits same as but the lower 8 bits different, from above-mentioned access address "000000h".

When the address decoder 5 decodes the lower 8 bits "01h" of the access address 1, entry No. 2 is obtained. Since this entry No. 2 is different from the entry No. 1 resulting from decoding the aforementioned access address "000000h", the higher 16 bits "0000h" of the access address 1 are stored in No. 2 entry of the address information storing unit 2, and the data "BBBBBBBBh" of the address "000001h" are stored in No. 2 entry of the data storing unit 3.

FIG. 3 is a schematic diagram showing the stored contents of the address information storing unit 2, data storing unit 3 and valid bit storing unit 4 after registering the data "BBBBBBBBh" of the address "000001h" in No. 2 entry of the cache memory by accessing the address "000001h".

As seen from FIG. 3, in the No. 1 and No. 2 entries of the address information storing unit 2, the same address "0000" is stored. Especially, when continuous addresses have been accessed as in the case of instruction fetching or when addresses of a specific range has been accessed in referring data, the same address is stored in a plurality of entries of the address information storing unit 2, this resulting in wasteful use of the memory area.

As mentioned above, when the memory accessing frequency of the microprocessor is higher, it is possible to reduce the number of memory elements required for the address information storing unit 2 by constituting the address information storing unit 2 commonly or hierarchically without undue lowering the system efficiency of the cache memory.

As such prior art there is an invention disclosed in Japanese Patent Application Laid-Open No. 2-161546 (1990) applied by the applicant of the present invention in Japan.

The invention of the Japanese Patent Application Laid-Open No. 2-161546 (1990) features straightforwardly the multistage constitution of tag memory dividing it into the common higher bits and the individual lower bits.

Hereinafter, Japanese Patent Application Laid-Open No. 2-161546 (1990) will be explained.

FIG. 4 is a block diagram showing a specific constitution of the cache memory of the invention disclosed in Japanese Patent Application Laid-Open No. 2-161546 (1990).

In this example, different from the prior art shown in FIG. 1, shown is a cache memory of 2-way set associative system with the address having 7 bits and 4 entries.

In FIG. 4, reference numeral 111 represents an access address which is outputted from the microprocessor (not shown). The access address 111 is made up of 4-bit address tag 112 (corresponding to higher 16 bits of the access address 1 in the prior art shown in FIG. 1), 2-bit entry address 113 and 1-bit byte address 114 (these 3 bits corresponding to the lower 8 bits of the access address 1 in the prior art of FIG. 1).

Reference numeral 115 represents a decoder for decoding the entry address 113 of the access address 111 and is corresponding to the address decoder 5 in FIG. 1.

Reference numeral 166 (166a, 166b) represents a first tag memory, and in this cache memory shown in FIG. 4, is composed of 2 bits for storing bits corresponding to the higher 2 bits of the address tag 112 composed of 4 bits of the access address 111 of each data.

Reference numeral 176 (176a, 176b) represents a second tag memory, and in the cache memory shown in FIG. 4, stores the lower 2 bits of the address tag 112 composed of 4 bits of the access address 111 of each data.

In other words, the 16-bit width address information storing unit 2 in the prior art shown in FIG. 1 is divided into the several higher bits and the remaining lower bits, and the several higher bits are taken as the first tag memory 166 (166a, 166b) and the remaining lower bits as the second tag memory 176 (176a, 176b).

Accordingly, in the cache memory shown in FIG. 4, only the data of the access address 111 whose higher 2 bits of the address tag 112 agree with 2 bits stored respectively in the first tag memory 166 (166a, 166b) are held in the data memory 118 (118a, 118b).

Reference numeral 118 (118a, 118b) represents a data memory (corresponding to the data storing unit 3 of the prior art shown in FIG. 1), which stores therein 2-byte data specified by the address composed of 2 bits each of the first tag memory 166 and the second tag memory 176.

Reference numeral 117 (117a, 117b) represents a valid bit, showing whether the memory contents of the data memory 118 is valid or not.

Reference numeral 119 (119a, 119b) represents a comparator (corresponding to the comparator 6 of the prior art of FIG. 1), which is used for judging whether the address tag 112 agrees with the address composed of each 2 bits of the first tag memory 166 and the second tag memory 176 or not.

Reference numeral 120 (120a, 120b) represents a byte selector for selecting the byte data of the data memory 118 according to the contents of the byte address 114.

Reference numeral 121 (121a, 121b) represents a hit signal showing the judging result by the comparator 119.

Subscripts "a" and "b" attached to the aforementioned reference numerals 117 to 121, 166 and 176 indicate corresponding to two ways respectively.

Reference numeral 122 represents a way selector selecting an output of the byte selector 120 by the hit signal 121, and 123 represents a data output which is an output of the way selector 122.

Operation of the cache memory of the invention of Japanese Patent Application Laid-Open No. 2-161546 (1990) shown in FIG. 4 is as follows.

When the access address 111 is given from a data processor (not shown) to the cache memory, contents of the first tag memory 166 and contents of the second tag memory 176 of each way indicated by the entry address 113 are given to the comparator 119 as well as contents of the data memory 118 is given to the byte selector 120. Byte data selected by the byte selector 120 is sent to the way selector 122.

Then, judgment is made whether the contents and the valid bit 117 of the selected second tag memory 176 agrees with the address tag 112 of the access address 111 or not by the comparator 119. When there is an agreeing way, the data of the agreeing way is outputted from the way selector 12 as the data 123. When it is judged as not agreeing, access is made to the external memory (not shown), the data to be required is given to the microprocessor and is stored in the data memory 118 of the cache memory. In addition, the higher 2 bits of the address tag 112 of the access address 111 of the data are required to agree with the contents of the first tag memory 166.

Thus, according to the invention disclosed in Japanese Patent Application Laid-Open No. 2-161546 (1990), the number of memory elements of the tag memory indicating whether the data for accessing by the microprocessor is held or not don't increase in proportion to the holdable data, this resulting in improvement of the hardware efficiency.

In the prior art disclosed in the aforementioned Japanese Patent Application Laid-Open No. 2-161546 (1990), however, no explanation is made to the updating method and timing of the first tag memory shown by the reference numeral 166 (166a, 166b) and the second tag memory shown by 176 (176a, 176b) in FIG. 4.

For example, in the constitution of the cache memory of the direct mapping type shown in FIG. 4, when the tag unit has been commonized to be one and the tag unit is, for example, updated by both the instruction data address and the operand data address at the instruction execution of the microprocessor, there is a high possibility of the address of the instruction data registered once in the cache memory is re-written by the address of the operand data. Hence, the possibility of the cache memory being hit as the next instruction data has been accessed to is lowered, this possibility resulting in failure to operate efficiency.

Thus, in the constitution of the conventional cache memory, it was necessary to have an address data storing unit for storing the memory address in each of the entries for registering data. When the address information storing unit alone is downsized, however, it is likely to result in lowering of the hit ratio and there is a risk of the cache memory not operating efficiently.

SUMMARY OF THE INVENTION

The present invention has been made in view of the aforementioned circumstances. In a microprocessor having a function for accessing to an external memory with the register value as an address used for accessing to the external memory, it is an object to provide a cache memory built in the microprocessor with simple constitution and efficiency by updating the address information storing unit of the cache memory by the higher value of the aforementioned register such as a stack pointer, a program counter or the like.

More specifically, an object of the present invention is to provide a cache memory basically same in constitution and efficiency as the invention disclosed in the aforementioned Japanese Patent Application Laid-Open No. 2-161546 (1990).

The first invention of the present invention relating to a cache memory is so constituted that an address information storing unit, which hitherto has a plurality of entries each for storing a part of an address to be accessed, is made to store only one value of a register such as a program counter, a stack pointer or the like.

The second invention of the present invention relating to a cache memory comprises a plurality of address information storing units and data storing units of the first invention, and further comprises controlling means for controlling any of the aforementioned plurality of address information storing units which is re-written according to whether the data to be accessed are stored in the aforementioned plurality of data storing units.

The third invention of the present invention relating to a cache memory comprises, in addition to the first invention, offset registering means for registering offset of the branch destination addresses for the data stored at the head of the data storing units, and a subtracter for subtracting the offset from the register value.

In the first invention, since it is possible to store data in the data storing unit when it is in the location which can be specified by one address stored in the address information storing unit, cache hit is done continuously to some extent when, for example, the address specified by the program counter or the like is stored in the address information storing unit.

In the second invention, it is possible to register more data by being provided with a plurality of sets of address information storing units and data storing units.

In the third invention, since an offset of the branch destination addresses with respect to the data stored at the head of the data storing unit is subtracted from the register value at executing a branch instruction, the instruction data following the head address of the branch instruction are stored successively from the head entry of the data storing unit.

The above and further objects and features of the invention will more fully be apparent from the following detailed description with accompanying drawings.

BRIEF DESCRIPTION OF THE DRAWINGS

FIG. 2 is a schematic diagram showing contents of an address information storing unit, a data storing unit and a valid bit storing unit after accessing has been made to a certain address by a microprocessor with a built-in cash memory;

FIG. 3 is a schematic diagram showing contents of an address information storing unit, a data storing unit and a valid bit storing unit after accessing has been made to some other address by a microprocessor with a built-in cache memory;

FIG. 6 is a schematic diagram showing a stored state of an instruction executed by a microprocessor in all external memory;

FIG. 8 is a schematic diagram showing an example of a program executed by a microprocessor having a cache memory of another embodiment of the first invention;

DESCRIPTION OF THE PREFERRED EMBODIMENTS

Hereinafter, the present invention will be described in detail with reference to the drawings showing its embodiments.

Figure 5:
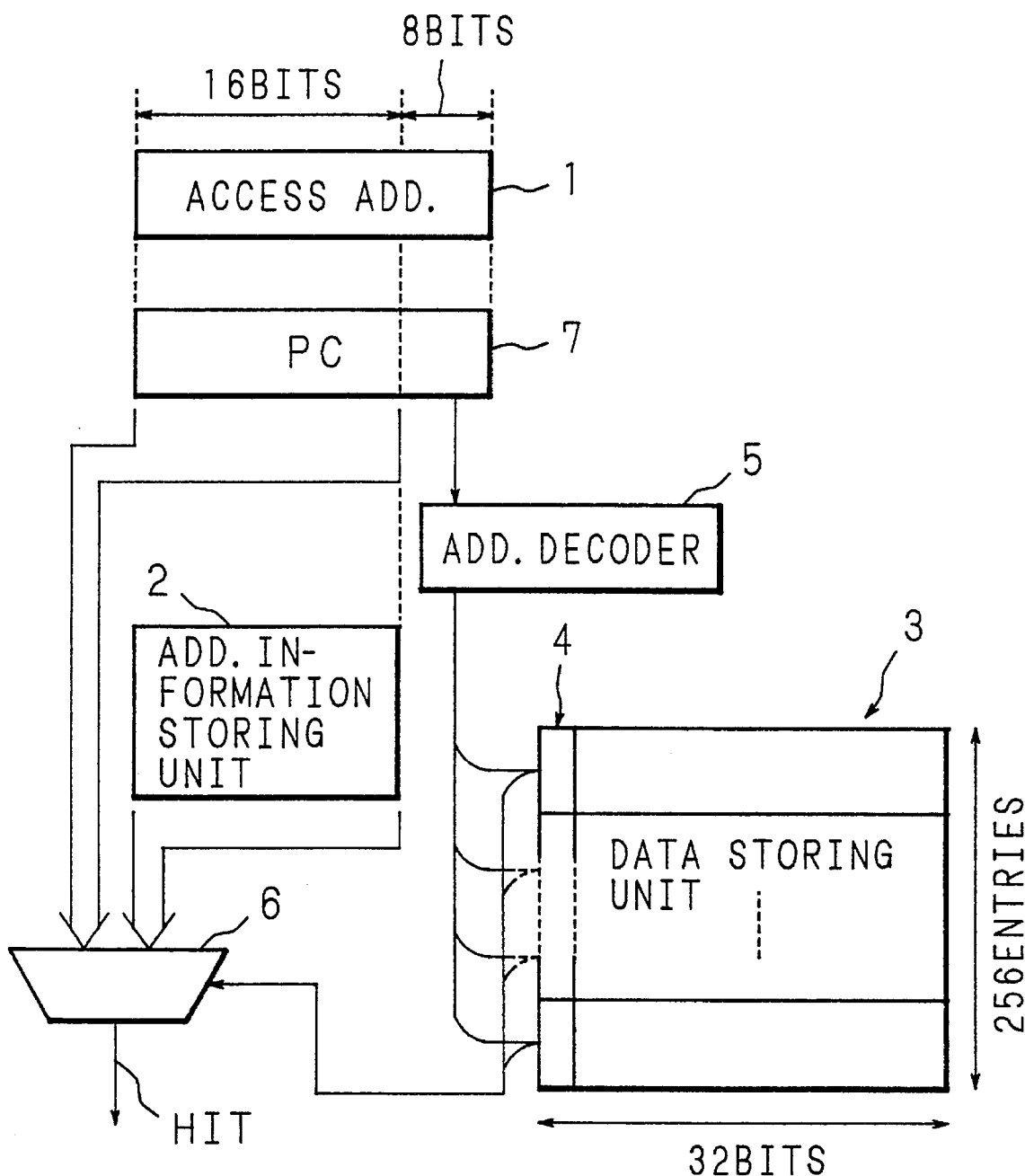
FIG. 5 is a block diagram showing a constitution of an embodiment of the first invention relating to a cache memory of the present invention.

FIG. 5 is a block diagram showing a constitution of an embodiment of a cache memory of the first invention.

Figure 1:
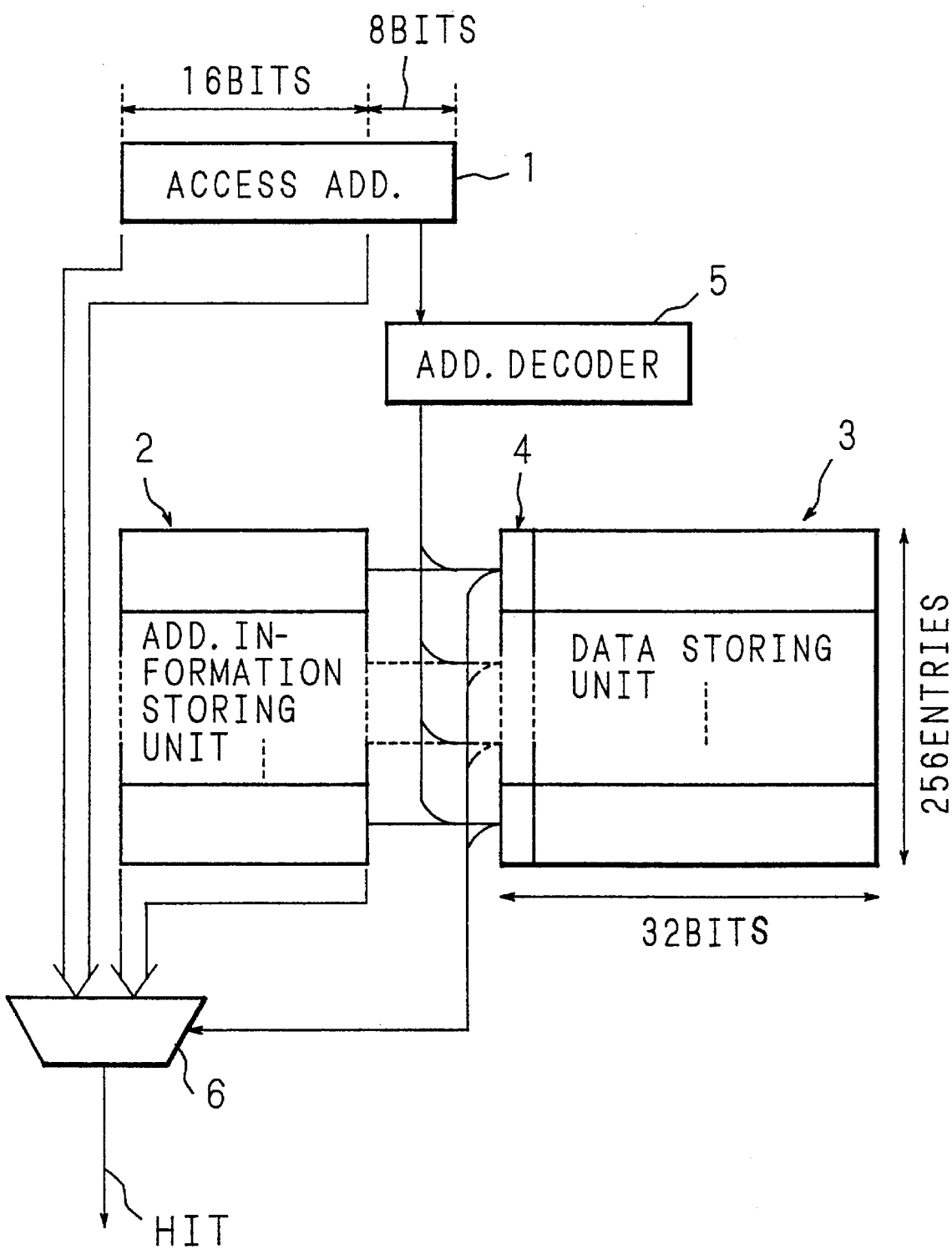
FIG. 1 is a block diagram showing a constitution example of a conventional cache memory built in a microprocessor.
Figure 4:
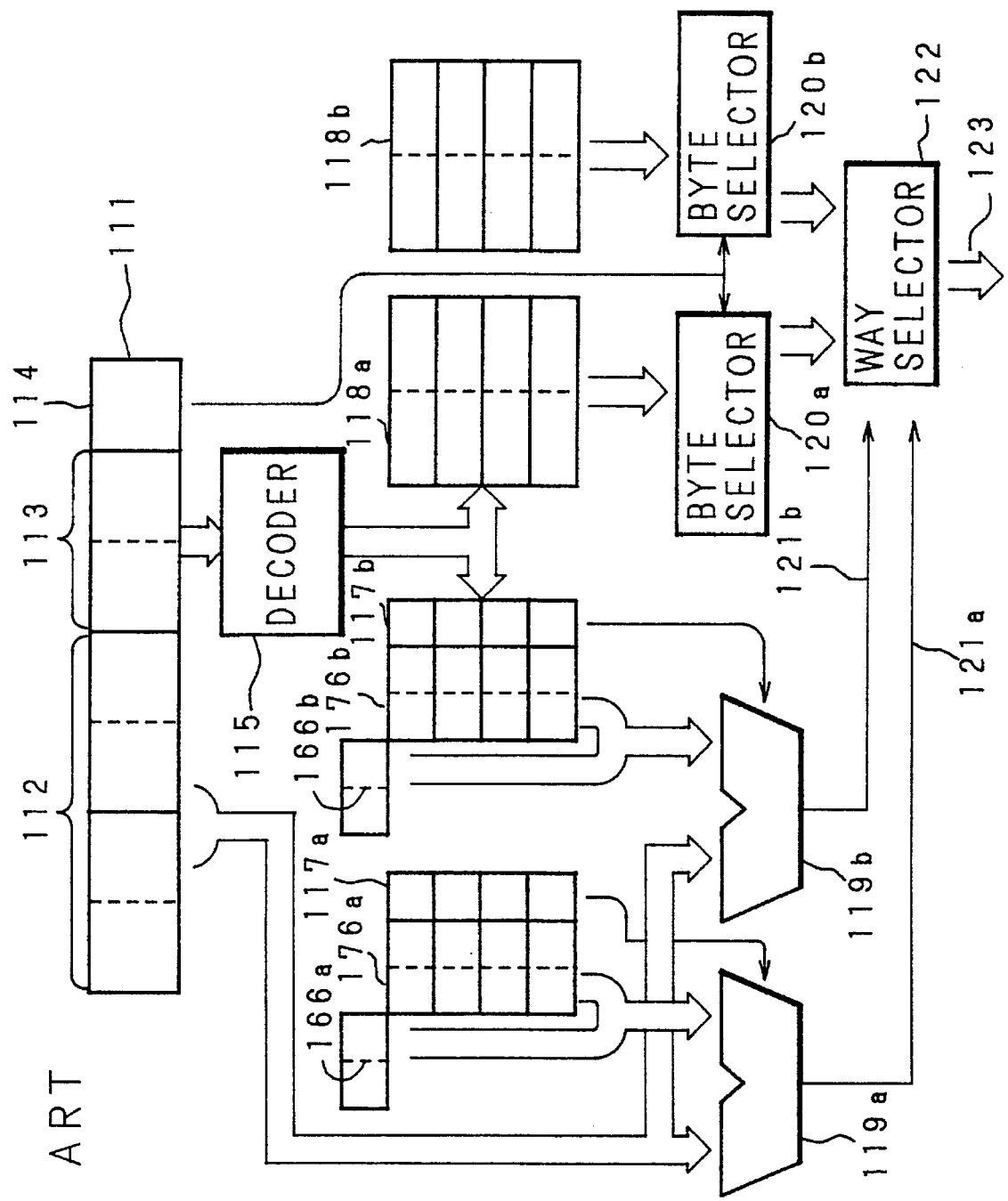
FIG. 4 is a block diagram showing a specific constitution of a conventional cache memory of the invention disclosed in Japanese Patent Application Laid-Open No. 2-161546 (1990)

In this FIG. 5, reference numerals used are the same as or corresponding to those in FIG. 1 referred to in the aforementioned prior art.

The embodiment shown in FIG. 5 is an example in which the present invention is applied to a program counter (hereinafter called "PC").

The cache memory of the first invention shown in FIG. 5 is 24-bit width ranging from bit 0 to bit 23 and the data is accessible in units of 32 bits.

In FIG. 5, reference numeral 1 represents an access address outputted from a microprocessor (not shown) and indicates the stored position of a data (instruction data or operand data) which is to be fetched by the microprocessor in an external memory (not shown).

The reference numeral 2 represents an address information storing unit. The address information storing unit 2 is a memory for storing one data which is the higher 16 bits of the 24-bit value (hereinafter called PC value) of the PC 7 described below.

Reference numeral 3 represents a data storing unit. The data storing unit 3 is a 32-bit width memory for registering 256 pieces of data which are read/write accessed from the external memory by the microprocessor according to the PC value.

The data storing unit 3 is composed of 256 entries determined by decoding the lower 8 bits of the PC value. Hence, one entry shown in FIG. 5 is, unlike in the prior art shown in FIG. 1, composed of the region of 32 bits of the data storing unit 3 and 1 bit of a valid bit, storing unit 4.

The valid bit storing unit 4 is composed of valid bits, 1 bit for each entry.

When each valid bit of the valid bit storing unit 4 is set to "1", the data stored in each entry of the data storing unit 3 is valid. When it is reset to "0", it means it is invalid.

Reference numeral 5 represents an address decoder. As mentioned above, the address decoder 5 decodes the lower 8 bits of the PC value and specifies uniquely one of 256 entries.

Reference numeral 6 represents a comparator used for comparison of the higher 16 bits of the PC value with the address information stored in the address information storing unit 2. When the valid bit in the valid bit storing unit 4 corresponding to the entry No. as the result of decoding by the address decoder 5 is valid and the comparison results agrees, the comparator 6 asserts the hit signal HIT.

As described below in detail, when the cache memory is hit (i.e. when the comparison result by the comparator 6 agrees and the data is valid) at read accessing by the microprocessor, the hit signal HIT from the comparator 6 is asserted and data is read from the corresponding entry of the data storing unit 3. When the comparison result of the comparator 6 do not agree, the value of the address information storing unit 2 is rewritten with the value of the higher 16 bits of new PC value.

Read operation of the cash memory according to the present invention shown in FIG. 5 will be explained below.

When the system as a whole is reset, all valid bits of the valid bit storing unit 4 are reset. Also, the microprocessor sets in the PC 7 a specific value, for example, "000000h (h shows hexadecimal notation)" and instructions from the address specified by the PC value are fetched successively from the external memory and executed.

FIG. 6 is a schematic diagram showing the stored state of instructions in the external memory executed by the microprocessor.

The instructions processed by the microprocessor are roughly divided into two kinds. One thereof is called nonbranch instruction. The non-branch instruction is the one by which, after execution of a certain instruction, the value of the PC 7 is updated so that the next instruction is executed immediately thereafter. The other is called branch instruction. The branch instruction is the one by which the target address of the next instruction to be fetched is changed to the address specified according to the conditions under the instruction execution.

Now it is supposed that the non-branch instructions are stored in the addresses from "000000h" to "00010Ch" of the external memory. Operation of the cash memory when these non-branch instructions are fetched and processed by the microprocessor will be explained.

At first, the microprocessor accesses to the external memory by bypassing the cache memory. When the microprocessor has finished instruction fetch, the data is stored in the No. 1 entry of the data storing unit 3 obtained by decoding the lower 8 bits ("00h") of the PC 7 and at the same time the No. 1 valid of the valid bit storing unit 4 is set to "1".

When an instruction fetch is required to the external address "000000h", it is to be judged whether the data to be required is registered in the cache memory or not as follows.

At first, comparison is to be made between the higher 16 bits of the access address 1 and the contents of the address information storing unit 2 of the cache memory. In this case, it is supposed to be judged as disagreement. At the same time, the lower 8 bits of the access address 1 is decoded by the address decoder 5 and an entry is specified, entry No. 1 in this case. Whether the data stored in the No. 1 entry of the data storing unit 3 is valid or not is judged by the value of the No. 1 valid bit of the valid bit storing unit 4. Now it is judged as valid.

As mentioned above, when the contents of the address information storing unit 2 agrees and the data stored in the data storing unit 3 is valid, it is judged that the data is registered at the access address in the cache memory. Since, in this case, the data of the address "000000h" is not registered, the cache memory continues memory access by the microprocessor. Hence, the microprocessor makes memory fetching for the external memory. The fetched data is stored in the No. 1 entry of the data storing unit 3, and the No. 1 valid bit of the valid bit storing unit 4 is also set, further the higher 16 bits of the access address 1 are stored in the address information storing unit 2.

Next, when an instruction access is required to the external address "000001h", whether the data is already registered in the cache memory or not is judged by the following processing.

At first, the higher 16 bits of the access address 1 is compared with the contents of the address information storing unit 2 by the comparator 6. In this case, both agrees at "0000h". At the same time, the lower 8 bits of the access address 1 is decoded by the address decoder 5 and all entry is specified, entry No. 2 in this case. Whether the data stored in the No. 2 entry of the data storing unit 3 is valid or not is judged by the value of the No. 2 valid bit the valid bit storing unit 4. Now it is judged as valid.

As mentioned above, when the contents of the address information storing unit 2 agrees and the data stored in the data storing unit 3 is valid, it is judged that the data is registered at the access address in the cache memory. In this case, since the data of the address "000001h" is not registered, the cache memory continues memory access by the microprocessor. Hence, the microprocessor makes memory fetching for the external memory. The fetched data is registered at the No. 2 entry of the cache memory in the same way as in the case of the address "000000h".

Since, as aforementioned, non-branch instruction are stored at the addresses from "000000h" to "00000Fh", data is successively registered at each entry of the cache memory in the aforementioned procedure.

Operation when the contents of the address information storing unit 2 of the cache memory fails to agree with the instruction fetch address will be explained.

After finishing the instruction processing of the external address "00000Fh", the microprocessor executes instruction fetching for the address "000100h". Since, in this case, the cache memory detects disagreement between the PC value and the contents of the address information storing unit 2 by the comparator 6, instruction fetching is done for the external memory. Also, the data of all entries are made invalid. Further, the contents of the address information storing unit 2 is re-written by the higher 16 bits of the access address 1, and the lower 8 bits "00h" of the access address 1 is decoded by the address decoder 5 and the resulting data is registered in the entry of the selected number (1 in this case) of the data storing unit 3.

Since, as aforementioned, non-branch instructions are stored in the addresses from "000100h" to "00010Ch" of the external memory, data of the address range shown by the address information storing unit 2 which is updated by execution of instruction by the microprocessor are successively registered in each entry as same as aforementioned.

Thus, since the address information storing unit 2 of the cache memory is automatically updated with executing instructions by the microprocessor, when the target address of instruction fetching is changed, it is possible to register successively instructions of the fetch target. This is exactly the same also when the branch instruction is executed by the microprocessor and the fetch target is changed.

Then, when the data required by instruction fetching is already registered in the cache memory will be explained.

It is supposed that the conditional branch instruction is stored in the external address "00010Eh" and the branch destination address is "000100h". When the microprocessor fetches the instruction of the address "00010Eh", the conditional branch instruction of the external address "00010Eh" is registered in the cache memory by the operation as mentioned above.

When the conditional branch instruction of the address "00010Eh" has been executed by the microprocessor and, as a result, an instruction fetch target address is determined to be, for example, "000100h", the microprocessor executes the next instruction fetch request for an address "000100h".

The cache memory judges whether the data of the access address 1 is already registered or not in the same way. In this case, since the data of the address "000100h" is already registered, access to the external memory is not done, and the data registered in the No. 1 specified by decoding the lower 8 bits "00h" of the access address 1 by the address decoder 5 of the data storing unit 3 is outputted and then given to the microprocessor.

Next, another embodiment in which the first invention is applied to a stack pointer (called SP, hereinafter) instead of the PC 7 shown in the aforementioned FIG. 5 with reference to the block diagram of FIG. 7.

Figure 7:
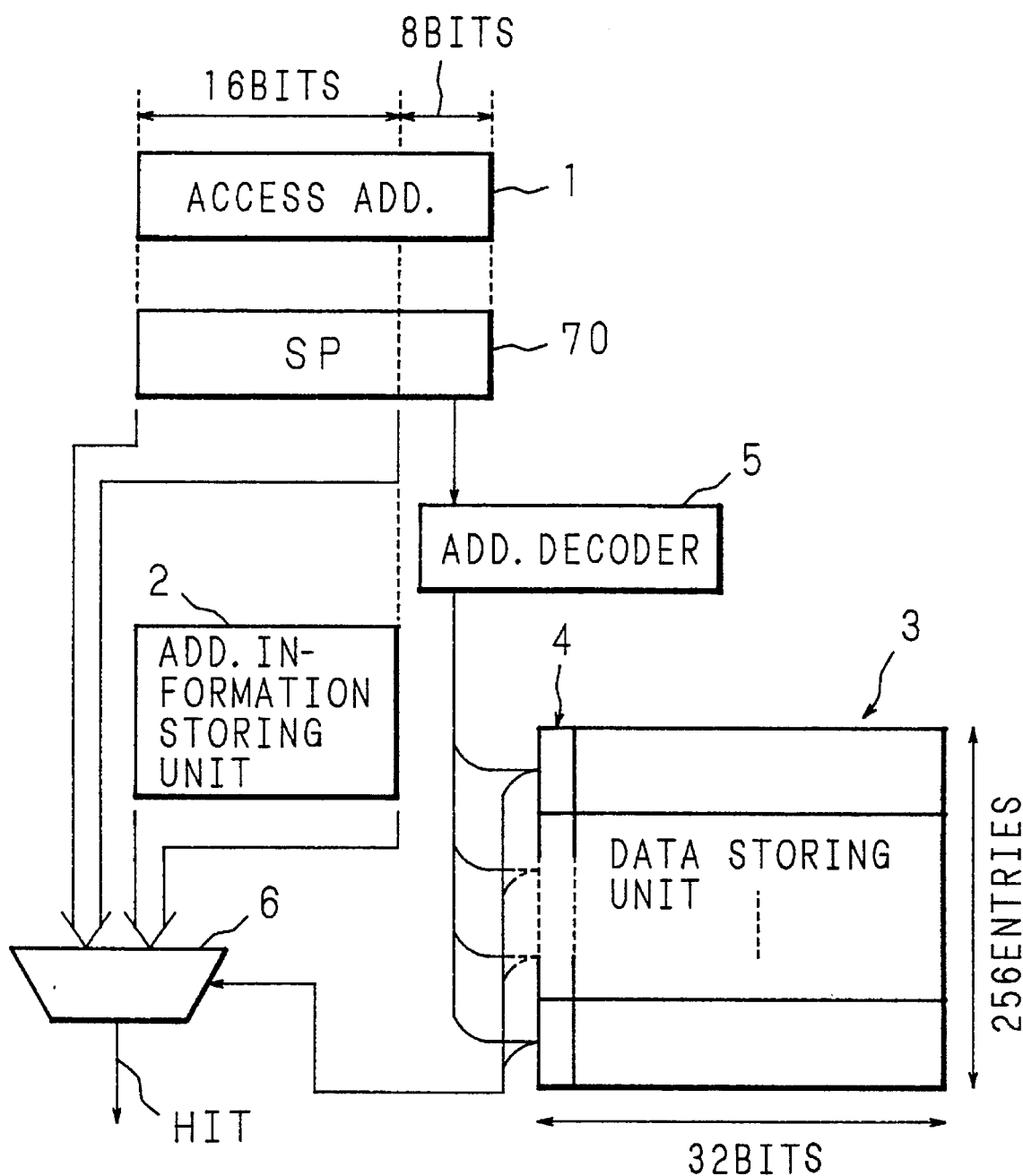
FIG. 7 is a block diagram showing another embodiment of the first invention relating to a cache memory of the present invention.

In FIG. 7, the SP 70 is used instead of PC 7 shown in FIG. 5.

Figure 9:
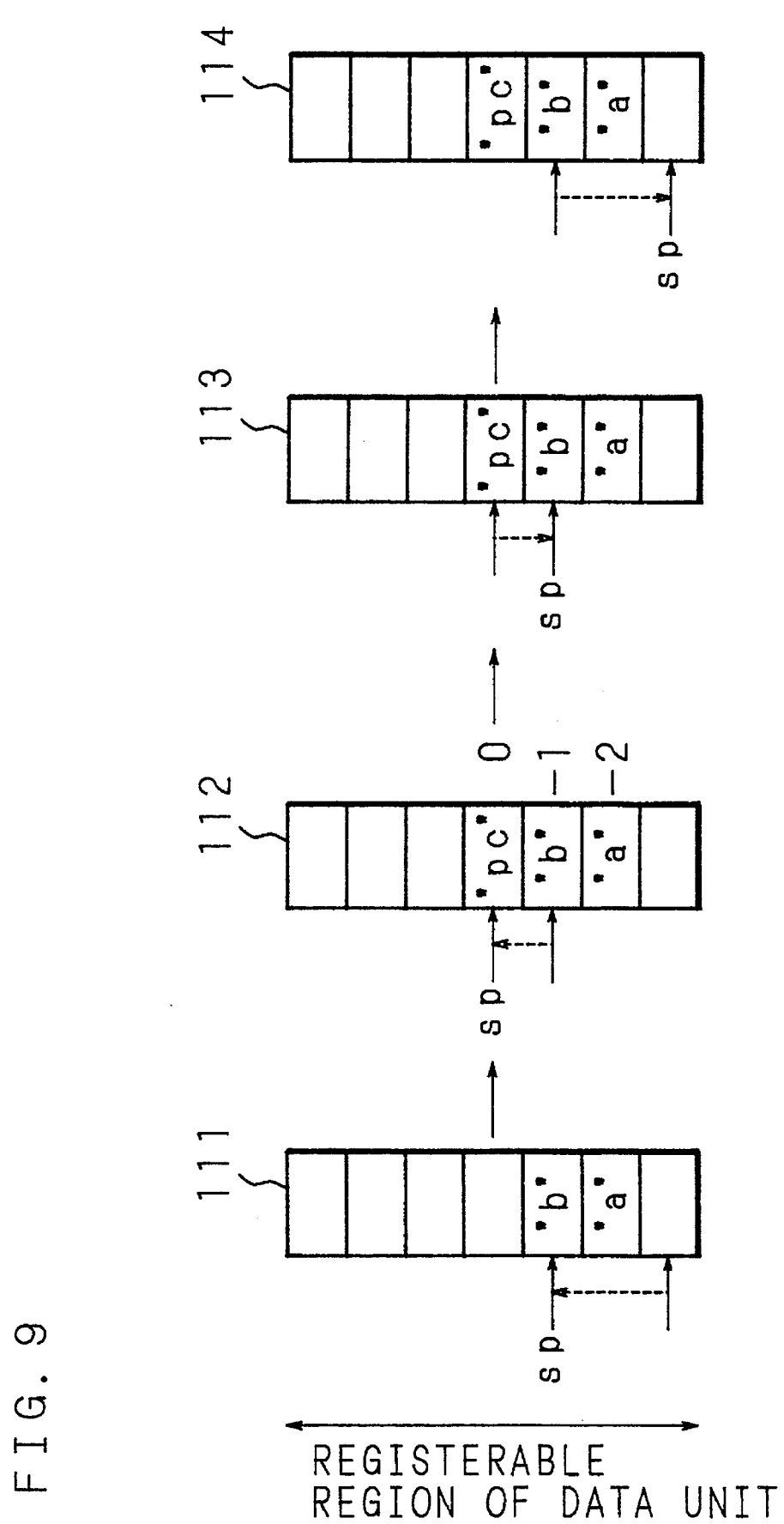
FIG. 9 is a schematic diagram showing an operation of a stack pointer when an example of a program in FIG. 8 is executed.

Since the SP 70 is different from the aforementioned PC 7 in function, explanation will be made with reference to the schematic diagram of FIG. 9 showing the operation of the SP 70, when the program example shown in FIG. 8 is executed by the microprocessor. FIG. 9 shows the address range which can be specified by the SP 70 in the external memory, in other words, registrable range in the data storing unit of the corresponding cache memory.

The program shown in FIG. 8 calls a subroutine with a parameter.

A "push" instruction shown by reference numeral 101 in FIG. 8 is an instruction for storing the contents of the specified register in the address of the external memory shown by the SP 70 after addition of the specified register size to the SP 70. Hence, when two "push" instructions are executed, the address indicated by the upward arrow shown by reference numeral 111 is specified by the SP 70 and the values "a" and "b" of registers a and b are stored in the external memory.

A "bsr" instruction shown by reference numeral 102 in FIG. 8 is an instruction for storing the contents of the PC 7 in the address of the external memory shown by the SP 70 after addition of the size of the PC 7 to the SP 70. Then, the address value specified by the "bsr" instruction (address "pc" specified by X) is stored in the PC 7. The state is indicated by reference numeral 112 in FIG. 9.

By the aforementioned operation, the return destination address "pc" of the subroutine and contents "a" and "b" of the registers a and b as parameters are stored in the address of the external memory shown by the SP 70. Such contents are also registrable in the data storing unit 3 of the cache memory by an operation same as in the aforementioned embodiment.

Then, the operation after execution of the instruction shown by reference numeral 103 in FIG. 8 will be explained.

Since the value "pc" of the PC 7 indicates an address X by the "bsr" instruction shown by reference numeral 102, hence a "mov" instruction shown by reference numeral 103 is executed at first. By the instruction shown by reference numeral 103, the address contents of the SP 70, namely the parameter "b" is stored in the register c, and by the subsequent "add" instruction, the address contents of the SP 70, namely the parameter "a" is added to the value "c" of the register c. A "rst" instruction shown by reference numeral 104 is the instruction for returning from the subroutine, and after storing the contents equivalent to register size (a value equivalent to the "sp" shown by reference numeral 113 in FIG. 9) of the PC 7 from the address indicated by the SP 70, subtraction by the register size of the PC 7 from the value of the SP 70 is made.

Since in the subroutine with a parameter, the stored address of the parameter is indicated by the SP 70, reference is made by relative addressing from the SP 70. In execution of the instruction from reference numeral 103 or more, any access is made toward the external memory since a parameter value is stored already in the data storing unit 3 of the cache memory.

A "pop" instruction shown by reference numeral 105 in FIG. 8 operates reversely to that of the "push" instruction shown by reference numeral 101. This is for having the position of the SP 70 adjusted to that at the time of subroutine call. This "pop" instruction subtracts the register size from the SP 70 after storing the address contents indicated by the SP 70 in the specified register. The address indicated by the SP 70 after execution of the two "pop" instructions shown by reference numeral 105 returns to the position indicated by a downward arrow in FIG. 9, by reference numeral 114, that is, where the SP 70 indicates before execution of the two "push" instructions shown by reference numeral 101.

When the stack moves within the address range of the external memory which can be stored in the data storing unit 3 as in the case of the aforementioned subroutine call, the aforementioned registration and reference of the parameter are done and, in case of reference, data can be supplied from the cache memory. When the higher bits of the SP 70 are changed by the instructions shown by reference numerals 101 and 102 in FIG. 8, the data in the data storing unit 3 of the cache memory become invalid and the address range specified by changed higher bits of the SP 70 can be registered anew in the data storing unit 3.

Examples of the subroutine coal with parameters shown in this embodiment are general and high in frequency of use as output codes when high level language such as the C, the Pascal or the like are compiled. Hence it is effective when the present invention is applied for the SP 70, too.

Then, the second invention of the present invention will be explained.

Figure 10:
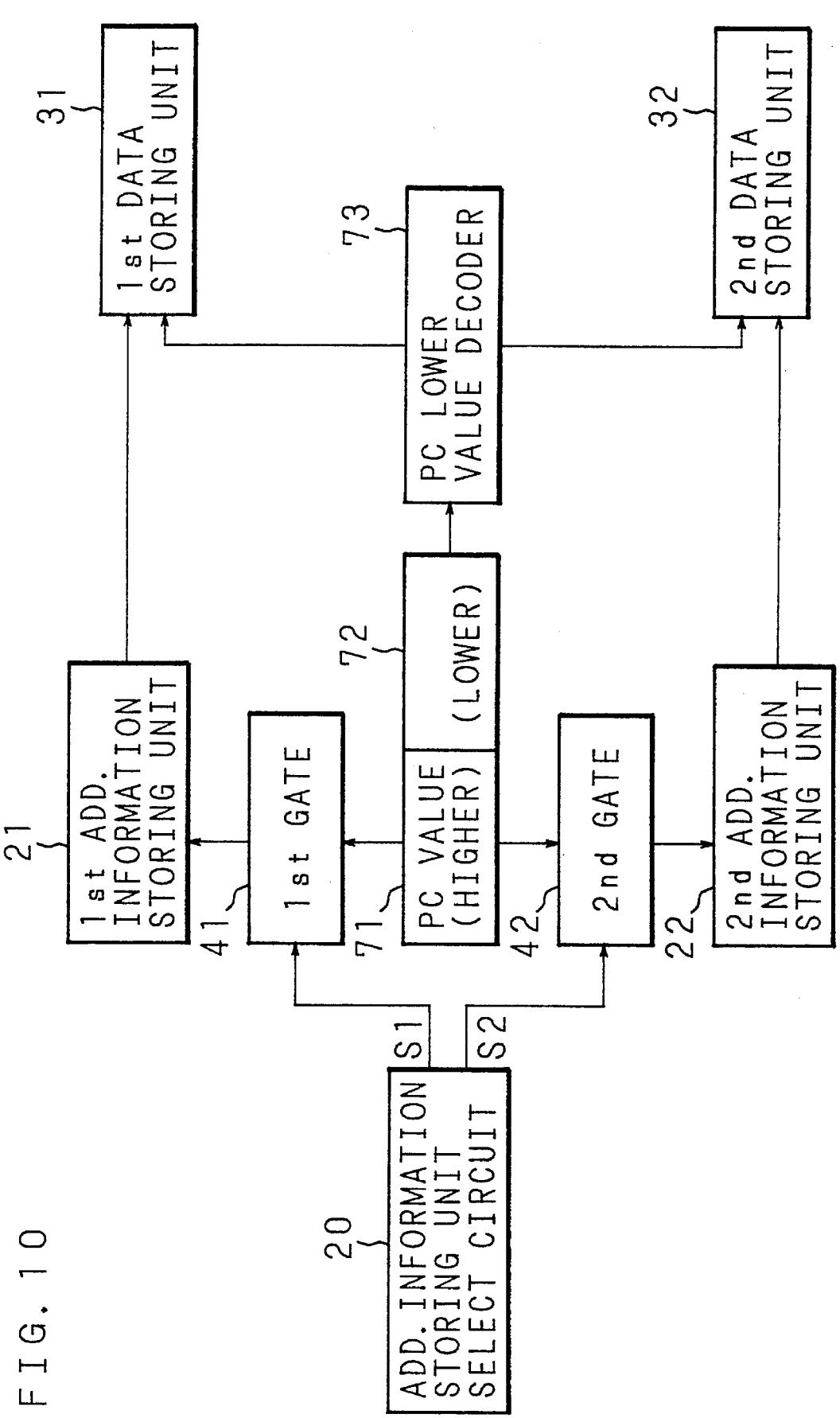
FIG. 10 is a block diagram showing an essential part of a constitution example of the invention relating to a cache memory.

A block diagram of the essential parts of an example of constitution of the cache memory of the second invention is shown in a block diagram in FIG. 10. In FIG. 10, essential parts required for explanation of the second invention alone are shown.

In this second invention, there are provided a plurality of sets of address information storing units and data storing units.

In a cache memory whose constitution is like that of the first invention as described above, especially in the constitution that, shown in FIG. 5, a part of the value of the program counter (PC) is stored in the address information storing unit 2, there is a risk of generating problems when the instruction processed by the microprocessor are loop-like.

That is, when the address range at its both ends processed to be in loop form, it is bound to exceed the addressable range by the address information storing unit 2, the data stored in the data storing unit 3 all come to be ineffective as the data make one round of the loop processing.

In order to cope with such problems, the cache memory of the second invention adopts the following constitution.

In the embodiment shown in FIG. 10, two sets of the address information storing unit and the data storing unit are provided to the abovementioned embodiment shown in FIG. 5. Specifically, to the PC 7 as external access register, first and second address information storing units 21 and 22 and the first and second data storing units 31 and 32 are connected.

In FIG. 10, reference numeral 20 represents an address information storing unit select circuit. When read miss or write miss occurs, selection is to be made whether writing the higher value 71 of the PC value and data into the first address information storing unit 21 and the first data storing unit 31 or writing the higher value 71 of the PC value into the second address information storing unit 22 and the second data storing unit 32.

With this cache memory of the second invention, when read miss occurs, it is necessary that access is made to the external memory and the missed data is to be written into either of both data storing units 31 and 32. In this case, the data fetched from the external memory is to be written into the data storing unit 32 (or 31) different from the storing unit 31 (or 32) which hits at the Last cache access.

When either of the first data storing unit 31 or the second data storing unit 32 has been write hit, it is necessary to re-write the hit data, hence the data have to be written into the data storing unit 31 (or 32) selected last time.

As mentioned above, reference numeral 71 represents the higher value of the PC value, specifically the higher 16 bits thereof. Reference numeral 72 represents the lower value of the PC value, specifically the lower 8 bits thereof. The lower value 72 of the PC value is decoded by the PC lower value decoder 73 to specify the entries of both data storing unit 31 and 32.

The data is written into the entry specified by the PC lower value decoder 73 of the first data storing unit 31 or the second data storing unit 32 selected by the address information unit select circuit 20.

The reference numerals 21 and 22 represent the first address information storing unit and the second address information storing unit 22 of the constitution similar to the address information storing unit 2 shown in FIG. 5 respectively, while reference numerals 31 and 32 represent the first data storing unit 31 and the second data storing unit 32 of the constitution similar to the data storing unit 3 shown in FIG. 5 respectively.

Both data storing units 31 and 32 are provided with the valid bits corresponding to each entry, being of the constitution similar to that shown in FIG. 5, but these are omitted in FIG. 10.

The reference numeral 41 represents the first gate, which is opened when a signal S1 given from the address information storing unit select circuit 20 is asserted and outputs the higher value 71 of the PC value to the first address information storing unit 21. The reference numeral 42 represents the second gate, which is opened when a signal S2 given from the address information storing unit select circuit 20 is asserted and outputs the higher value 71 of the PC value to the second address information storing unit 21.

Figure 11:
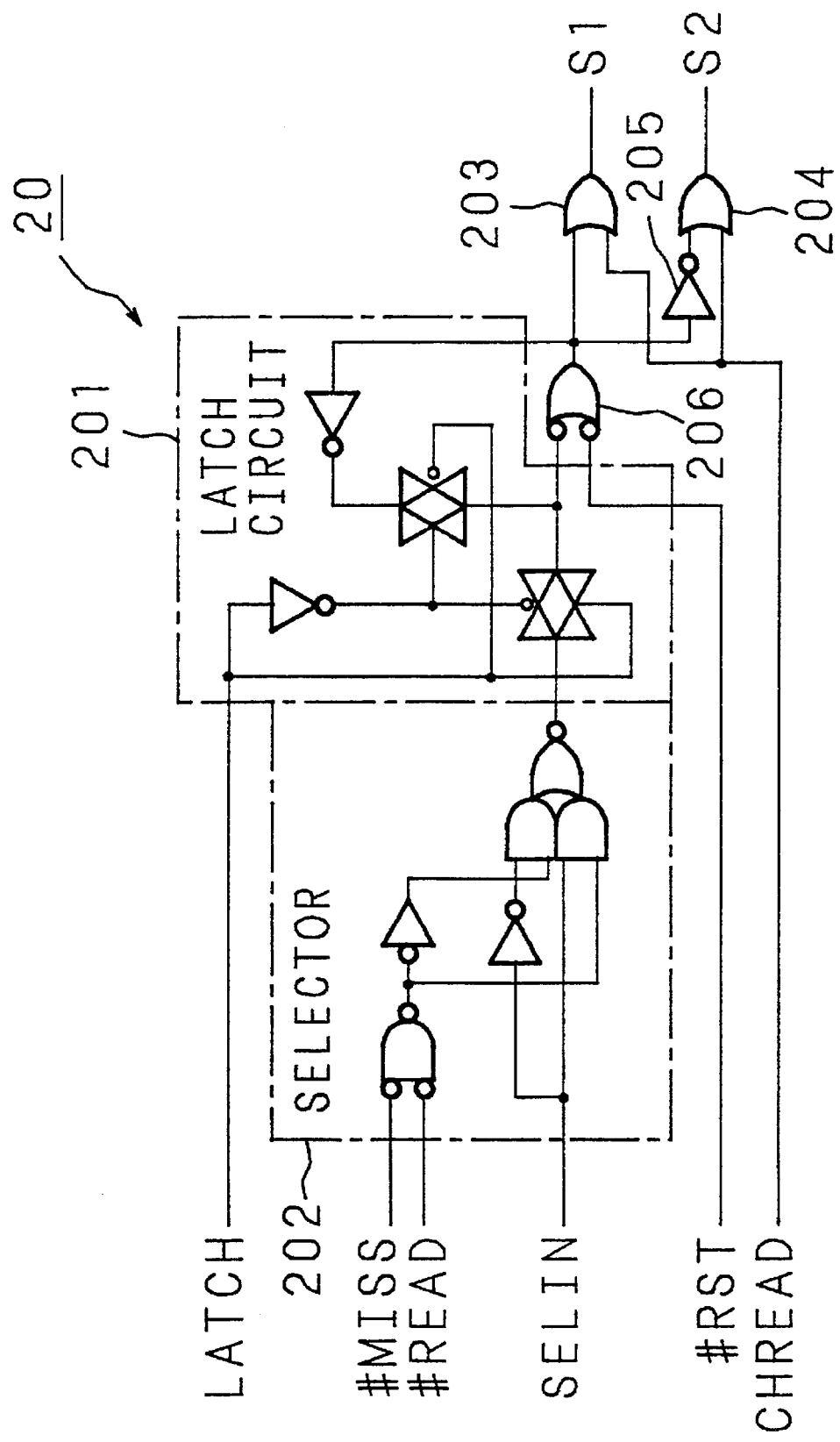
FIG. 11 is a circuit diagram showing a specific constitution example of an address information storing unit select circuit of a constitution example of a cache memory of the second invention.

FIG. 11 is a circuit diagram showing the specific constitution of the aforementioned address information storing unit select circuit 20.

This address information storing unit select circuit 20 is composed of mainly a selector 202 to which a miss signal #MISS, a read signal #READ and a select-in signal SELIN are inputted, and a latch circuit 201 which latches the output from the selector 202 by a latch signal LATCH.

In addition, the latch circuit 201 and the selector 202 are of known circuit constitution and, needless to say, its constitution may be that not shown in FIG. 11.

The miss signal #MISS is asserted when a cache miss has occurred.

The read signal #READ distinguishes reading or writing of the data access and indicates read access when it is asserted.

The select-in signal SELIN indicates that hit has occurred on the side of which address information storing unit (21 or 22) at that time. Specifically, when the select-in signal SELIN is asserted, it indicates that hit has occurred on the side of the first address information storing unit 21 and when it is negated that hit has occurred on the side of the second address information storing unit 22.

In addition, the select-in signal SELIN is meaningless when the miss signal #MISS is negated.

The selector 202 has inputs thereto the aforementioned 3 signals #MISS, #READ and SELIN, and outputs the information that hitting has occurred on either side of the address information storing units (21 or 22) to the latch circuit 201.

The latch circuit 201 has inputs thereto also the reset signal #RST and the latch signal LATCH. Hence the latch circuit 201 latches the output of the selector 202, namely the information that hit has occurred on either of address information storing units (21 or 22) in synchronous with the latch signal LATCH.

The output of the latch circuit 201 is given to one input of an OR gate 206 whose 2 inputs are negative logic, and the reset signal #RST is given to the other input of the OR gate 206. The output of the OR gate 206 is given directly to one input of an OR gate 203 and to the one input of an OR gate 204 through an inverter 205 respectively. To the other input of the OR gates 203 and 204, a cache read signal CHREAD is commonly inputted, and the respective outputs of the OR gates 203 and 204 become the selector signals S1 and S2.

Figure 12:
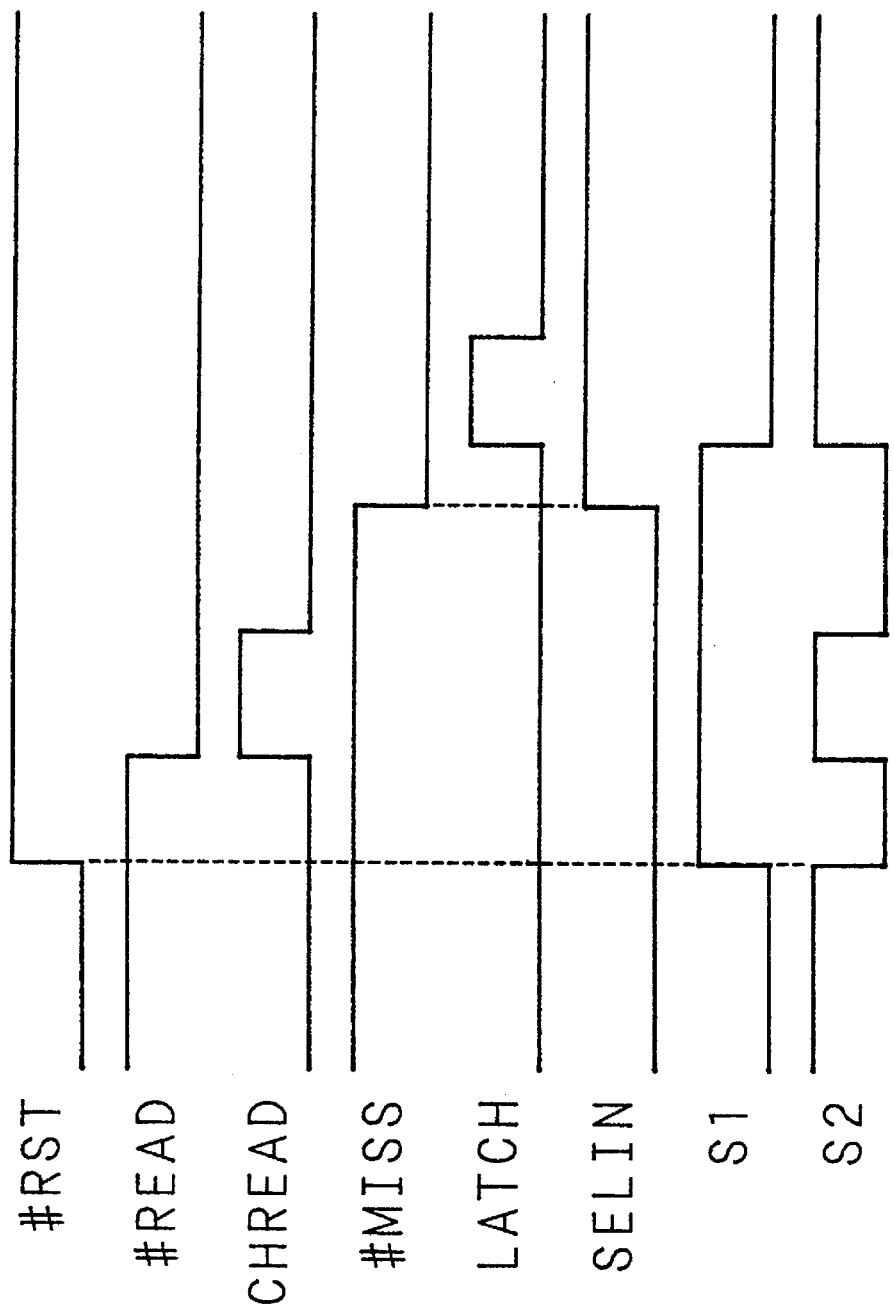
FIG. 12 is a timing chart showing an operation of the address information storing unit select circuit of a constitution example of a cache memory of the second invention.

The operation of the address information storing unit select circuit 20 shown in FIG. 11 may be seen from the timing chart of FIG. 12.

When the reset signal #RST is inputted to the address information storing unit select circuit 20 shown in FIG. 11 has been asserted, the output of the latch circuit 201 is reset and the first address information storing unit 21 is selected by assertion of the select signal S1. Also, the miss signal #MISS is negated by inputting of the reset signal #RST.

When the write access from the microprocessor is started, the cache memory asserts the cache lead signal CHREAD and reads out data from the cache memory regardless of accessing to either of reading/writing by the microprocessor. It is because the cache memory in this embodiment updates the registered data when the access data have hit the cache memory regardless of reading/writing by the microprocessor, it is necessary to execute read-out processing of registered data for judging hit/miss.

The cache read signal CHREAD is the signal for reading out data from the cache memory, hence, when this cache read signal CHREAD is asserted, reading out from both data storing units 31 and 32 is done for judging hit/miss, and the result is reflected on the miss signal #MISS and the select-in signal SELIN.

The miss signal #MISS is asserted to indicate occurrence of a miss when the access data is not registered in the first address information storing unit 21 or the second address information storing unit 22, and when it is registered, it is negated to indicate occurrence of hit.

The select-in signal SELIN is a signal indicating either of both address information storing units 21 and 22 has been hit. When the select-in signal SELIN is negated in FIG. 11, it means the second address information storing unit 21 having been hit, and when it is asserted, the first address information storing unit 22 having been hit. When the miss signal #MISS is asserted, that is, indicates an occurrence of a miss, the select-in signal SELIN becomes meaningless.

In the timing chart of FIG. 12, an example in which the select-in signal SELIN is asserted at the same timing as assertion of the miss signal #MISS is shown.

In the latch circuit 201, since the read signal #READ is asserted and the select-in signal SELIN which is inputted to the selector in the address information storing unit select circuit 20 passes the inverter, an inverted signal of the select-in signal SELIN is outputted from the selector 202. After at that, by assertion of the latch signal LATCH, the inverted signal of the select-in signal SELIN is latched, and the select signal S1 is inverted and negated. Then, the select signal S2, too, is inverted and asserted.

The operation of the address information storing unit select circuit 20 as described above, it is possible to successively hitting the cache memory even when the program executes loop processing by selecting the address information storing unit for re-writing in the event of read miss or write hit from either of the first address information storing unit 21 and the second address information storing unit 22.

Now the third invention will be explained.

The third invention is constituted to register data in the entry of the data storing unit 3 indicated by the entry number which is the offset from the entry number obtained by decoding the lower bits of the register, when registering data in the data storing unit 3 in the first invention shown in FIG. 5. This is in view of the problems of the first invention as shown in FIG. 5, which is described below.

Figure 13:
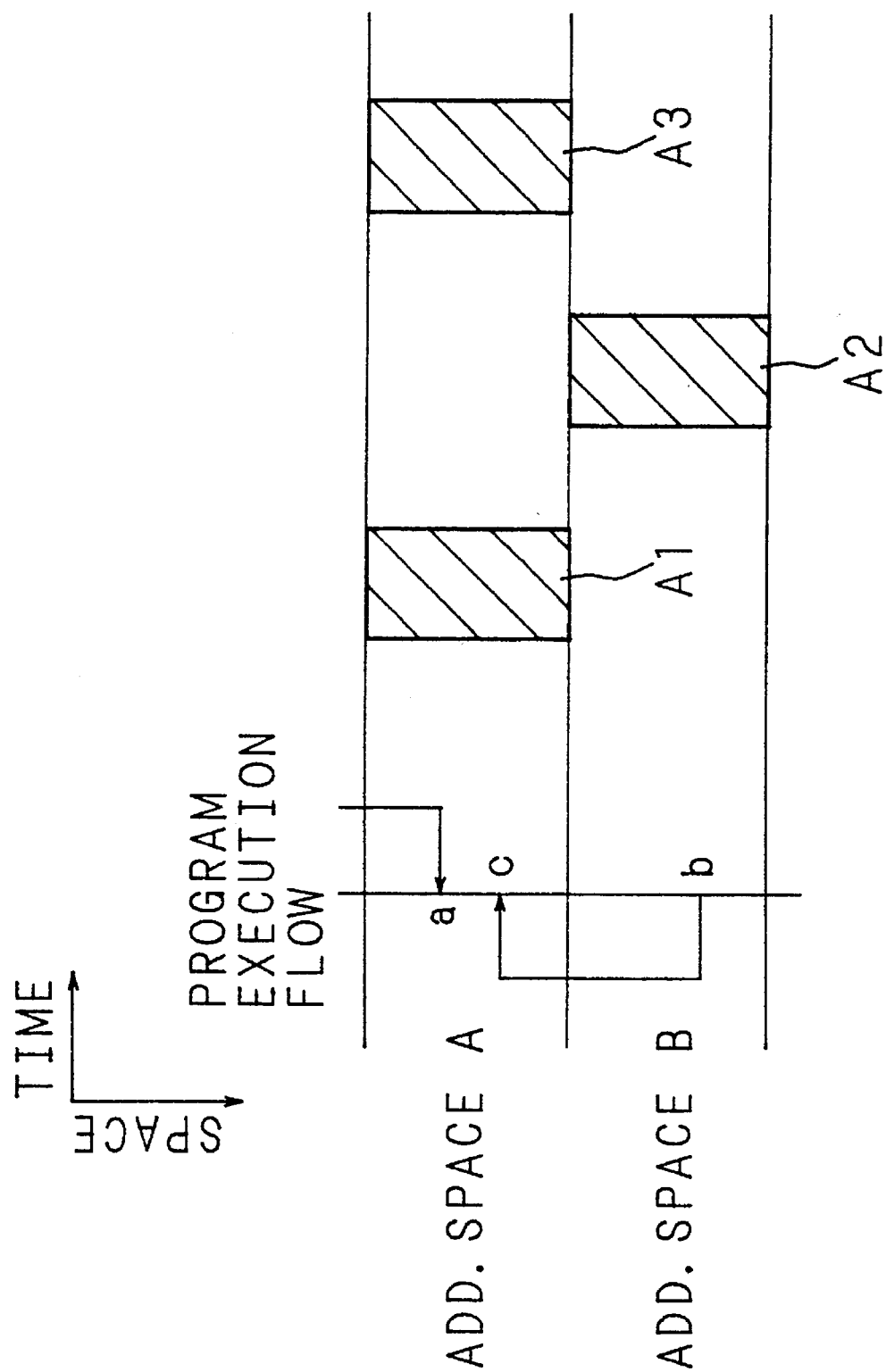
FIG. 13 is a schematic diagram showing a transient state of a caching space at executing a program by the cache memory according to the first invention shown in FIG. 5.

The schematic diagram of FIG. 13 shows the transient state of the caching space during execution of the program in the first embodiment shown in the aforementioned FIG. 5.

In FIG. 13, a range indicated by reference character A shows the lower side of the external memory space specified by the address information storing unit 2 and a range indicated by reference character B shows the higher side of the external memory space specified also by the address information storing unit 2. Hence, when the value of the address information storing unit 2 indicates the range A, the value added "1" thereto indicates the range B.

Execution flow of the program is shown on the left side of FIG. 13.

Now it is supposed that control of the program is moved to an address "a" in the address range A by the execution of a branch instruction and the instructions are successively executed until an address "b" in the address range B. Further, it is supposed that branching occurs at the address "b" by a conditional branch instruction to an address "c" in the address range A, thereafter loop processing is repeated several times between the address "b" and the address "c", and it is supposed that processing flows toward the lower side of FIG. 13 due to no established of conditional branching.

When the program has been executed as described above, the data storing unit 3 caches the address range A as indicated by reference numeral A1 when the processing has moved to the address "a".

Then, since the value of the address information storing unit 2 is updated when execution of the program moves into the address range B, the address range B is cached as indicated by reference numeral A2 in the data storing unit 3. When, however, execution of the program has moved from the address "b" to the address "c" by conditional branching, the value of the address information storing unit 2 is again updated and the address range A is cached as indicated by reference symbol A3 in the data storing unit 3.

Thereafter, each time at that the program execution moves from the address "c" to the address "b", the contents of the address information storing unit 2 is updated on the way of program execution and the address range B is cached in the data storing unit 3, and each time at that the program execution is branched from the address "b" to the address "c", the contents of the address information storing unit 2 is updated and the address range A is cached in the data storing unit 3.

Hence, since the data registered in the data storing unit 3 are updated without being hit, a problem such that the cache memory is totally useless is generated.

Figure 14:
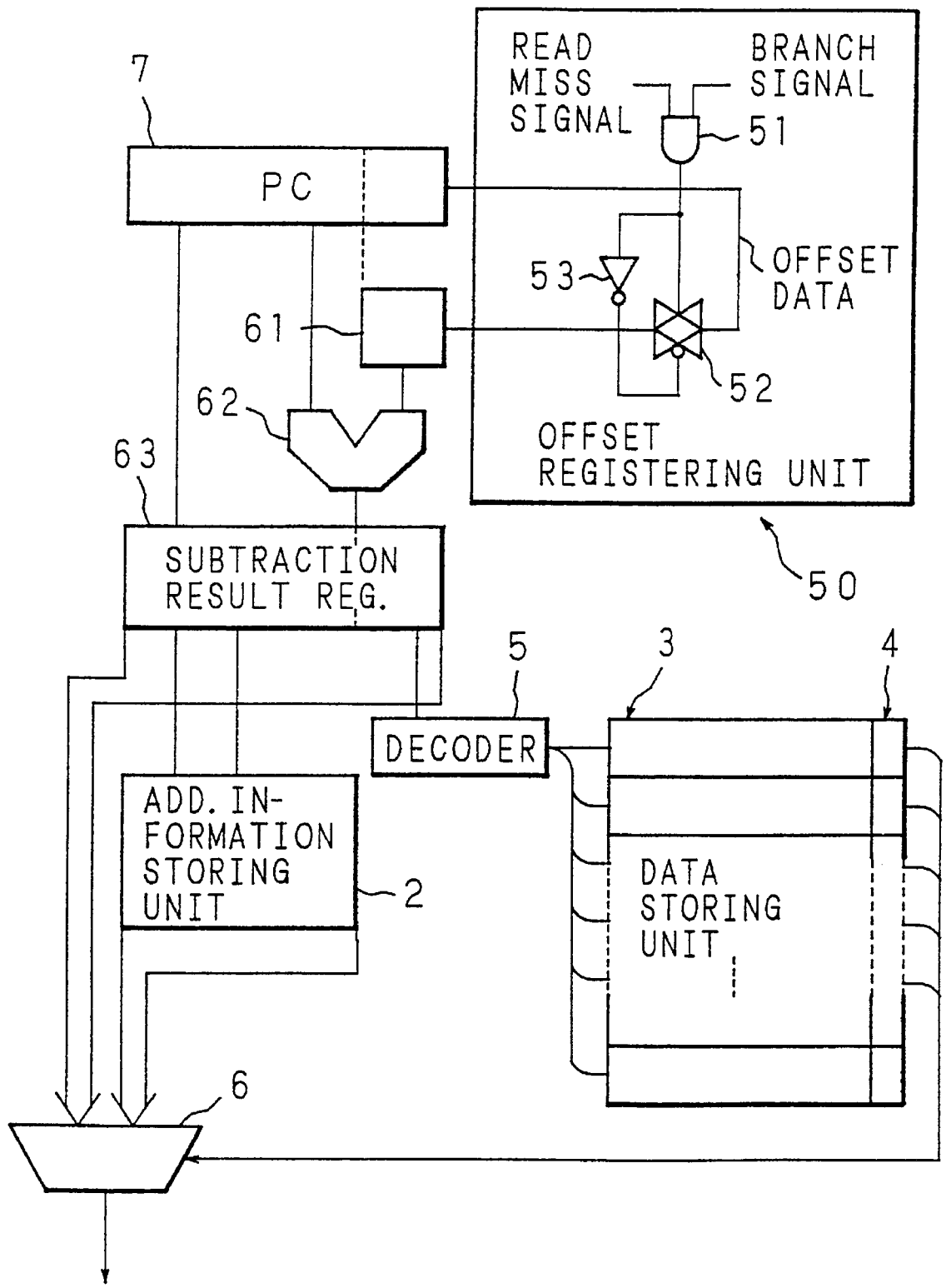
FIG. 14 is a block diagram showing an essential part of the constitution example of the cache memory according to the third invention.

In view of such situation, the third invention related to a constitution as shown in the block diagram of FIG. 14 is designed.

In FIG. 14, it is the same as in the first invention shown in the aforementioned FIG. 5, reference numeral 2 representing an address information storing unit, 3 a data storing unit, 4 a valid bit storing unit, 5 an address decoder, and 7 a PC respectively.

Reference numeral 50 represents an offset registering unit which, as described below in detail, judges whether the offset data is to be registered or not in the offset register 61 when the branch instruction is executed by the microprocessor.

Reference numeral 62 represents a subtracter, which subtracts the value of the offset register 61 from the instruction fetch address indicated by the PC 7. The subtraction result by the subtracter 62 is registered in a subtraction result register 63.

Then, the operation of the cache memory according to the third invention shown in FIG. 14 will be explained.

At first, the case where the microprocessor executes the program sequentially will be explained and then explanation will be given on the processing when the branch instruction is executed.

When the microprocessor executes the program sequentially, the processing will be as follows.

When the offset register 61 of the cache memory shown in FIG. 14 is reset, "0" is registered. Since in this case, the branch instruction is not executed, there is no possibility of the branch signal being asserted. The read miss signal is negated until the hit/miss judgment completes. Both signals are inputted to the AND gate 51 and at this time, the cache memory of the third invention operates in exactly the same way as the cache memory of the first invention.

When the microprocessor executes a branch instruction, the processing will be as follows.

When the microprocessor executes a branch instruction, the branch destination address is retained by the PC 7. At the same time, the branch signal is asserted in the offset registering unit 50. The read miss signal is negated until the hit/miss judgment completes. Since the output of the AND gate 51 is then negated, the AND gate 52 of the offset registering unit 50 is closed, there is no possibility of the offset data being registered by the offset register 61.

When the value of the PC 7 is transmitted to the subtracter 62, the value "0" of the offset data is subtracted by the subtracter 62 and the result is retained by the subtraction result register 63. Then, the lower 8 bits of the subtraction result register 63 is decoded by the address decoder 5 to specify the entry of the data storing unit 3 and at the same time, the valid bit of the valid bit storing unit 4 according to the specified entry is read out. At the same time, the value of the address information storing unit 3 and the higher side value (high-order digits) of the subtraction result register 63 are compared by the comparator 6.

It is judged as hit when the valid bit is valid and the comparison result agrees, and judged as miss otherwise.

When the processing of the branch instruction is judged as read hit or read miss, explanation will be made below.

When the cache memory judges as read hit, the access of the microprocessor to the external memory is interrupted and the data of the data storing unit 3 is fed to the microprocessor. In this case, the value of the address information storing unit 2 is not re-written. Also, since the read miss signal is not asserted, the output of the AND gate 51 is not asserted, so that the value "0" of the offset register 61 is not rewritten, either.

When the cache memory judges as read miss, the value of the data storing unit 3 is updated by the value of the higher 24 bits of the PC 7. Also, all valid bits of the valid bit storing unit 4 are made invalid and, thereafter, the instruction code read from the external memory at read miss is registered in the entry of the data storing unit 3 whose number is indicated by the address decoder 5. This operation is the same as in the first invention shown in FIG. 5.

Since the read miss signal is asserted and the output of the AND gate 51 is asserted, too, the transfer gate 52 of the offset registering unit 50 is opened and the lower 8 bits of the PC 7 are registered in the offset register 61 as the offset. Thus, when read miss has occurred during execution of the branch instruction, the value of the offset register 61 is updated. Unless the microprocessor executes the branch instruction, the value of the offset register 61 is not updated.

The instruction address of the branch destination is indicated by the PC 7. Since the value of the lower 8 bits of the PC 7 are registered in the offset register 61, the lower 8 bits the subtraction result by the subtracter 62 becomes "0" and since the entry No. of the data storing unit 3 becomes also 0, the instructions of the branch destination are stored from the head entry successively.

Figure 15:
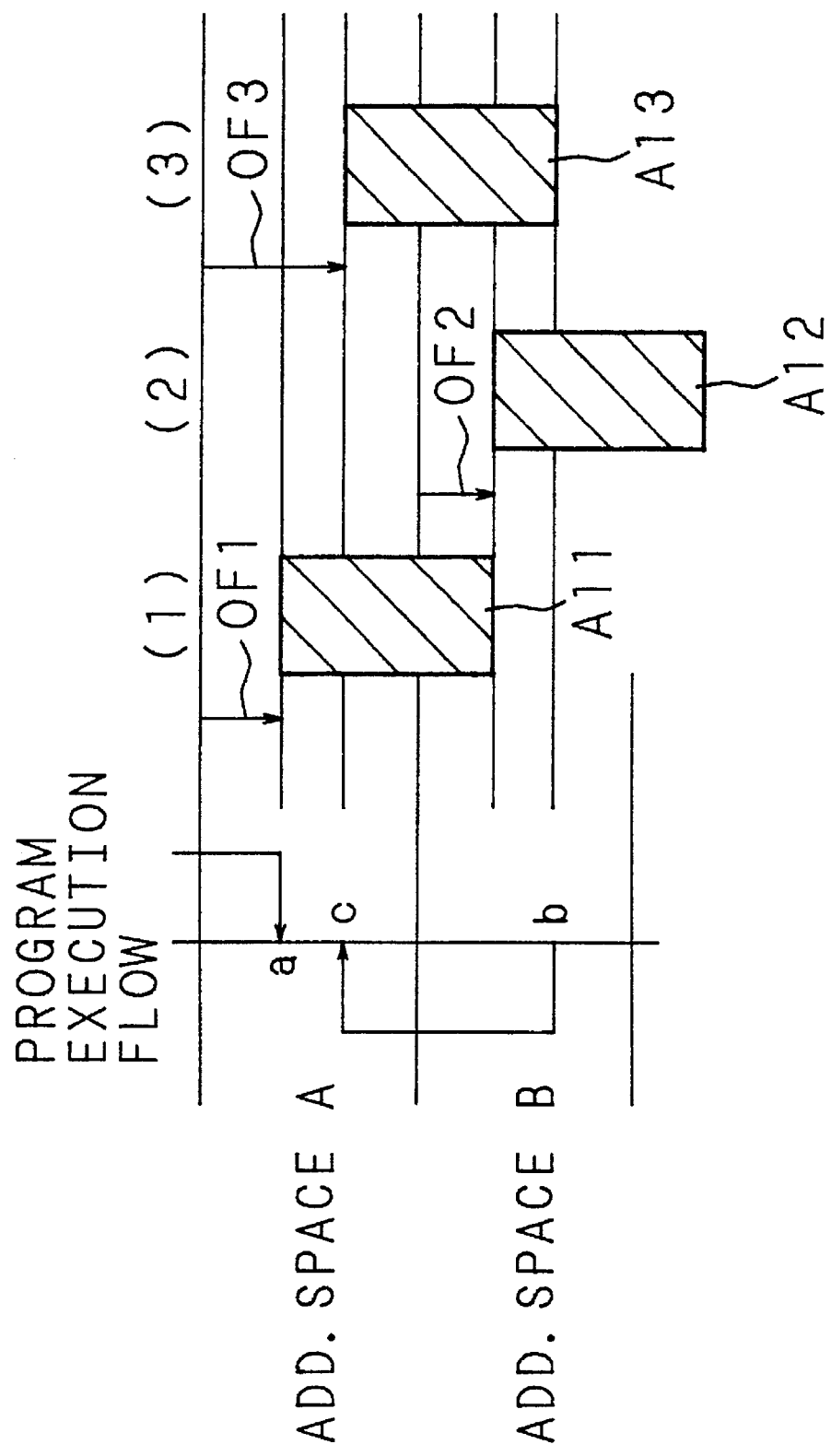
FIG. 15 is a schematic diagram showing a transient state of a caching space at executing a program by the cache memory according to the third invention.

The following explanations will be given with reference to the schematic diagram of FIG. 15. Like as FIG. 13, the schematic diagram of this FIG. 15 shows the transient state of the caching space at executing the program and the range shown by reference character A indicates a space of a lower side address of the external memory and the range shown by reference character B indicates a space of a higher side address of the external memory respectively. Hence, when the value of the address storing unit 2 indicates the range A, the value added "1" thereto indicates the range B.

On the left side of FIG. 15, there is shown the program execution flow.

Now it is supposed that control of the program moves to the address "a" in the address range A by the execution of the branch instruction, and the instructions are successively executed until the address "b" in the address range B. Further branching is done at the address "b" by the conditional branch instruction to the address "c" in the address range A, and thereafter loop processing is repeated several times between the address "b" and the address "c", and it is supposed that processing flows toward the lower side of the drawing due to no establishment of conditional branching.

When the program is executed as mentioned above and processing moves to the address "a", the value indicating the address range A is retained in the address information storing unit 2. Also, the value of offset OF1 is registered in the offset register 61. The instructions of address "a" are, as mentioned above, stored in each entry from the No. 0 entry onward. That is, the instructions from the branch destination are successively stored in each entry from the head entry of No. 0 in the data storing unit 3 successively, and the address range indicated by reference numeral A11 is registered.

Thereafter, when execution of the program exceeds the address range shown by A11, the value of the address information storing unit 2 comes to disagree with the address to be executed, this resulting in all registered data in the data storing unit 3 being invalid. Then, in the address information storing unit 2, the data in the address range shown by reference numeral A12 are registered. Since in this case, the branch instruction is not executed, the value of the offset resistor 61 is not re-written. The value of the offset OF2 is equal to the value of the offset OF1.

When execution of instructions proceeds until the address "b", the instruction execution moves by branching to the address range shown by reference numeral A13.

In the address range shown by A13, instructions of address "c" are stored from the head entry of the data storing unit 3 successively. Since in the address range shown by A13, both address "c" and the address "b" are included, the instructions registered in the cache memory, that is, the instructions in the address range shown by A13, continue being hit while the instructions repeat loop processing between the address "c" and the address "b".

Thus, the third invention, unlike the first invention, a subtracter is required as well as more operating time. When an instruction is branched, the branch instructions are registered in the data storing unit 3 of the cache memory from the head entry successively, hence the programs constitute a loop and, when the loop is small enough to be retained in the data storing unit 3, the cache memory continues being hit while instruction execution by the microprocessor repeats the loop processing, this resulting in an extremely high efficiency.

As mentioned above, according to the first invention, the address information storing unit conventionally having a plurality of entries, each thereof storing a part of the address to be accessed, can be adapted to each one of the register values such as a program counter, a stack pointer or the like. Hence the necessary number of memory elements required for address information storing units can be largely reduced.

According to the second invention, the cache memory comprises a plurality of address information storing units and data storing units, hence it is possible to register more data.

According to the third invention, in execution of the branch instruction, the offset of branch destination addresses with respect to the data stored at the head of the data storing unit can be subtracted from the register value, the leading and subsequent addresses of the branch instructions are successively stored. Hence, when the loop processing range is storable in the data storing unit, hitting is continued during loop processing.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalents of such meets and bounds thereof are therefore intended to be embraced by the claims.

What is claimed is:

1. A cache memory built in a microprocessor having access to an external memory, comprising:

a register for storing a value used by said microprocessor as an address to access said external memory;

an address information storing unit for storing value of the high-order digits of said address;

a data storing unit for registering data of said external memory defined by an address range; and agreement detecting means for detecting agreement of the value stored in said address information storing unit and the value of said register;

wherein when agreement is detected by said agreement detecting means, the data stored in said data storing unit is accessed, and when disagreement is detected by said agreement detecting means, said external memory is accessed, the value of said address information storing unit is updated in accordance with the value of said register, and the contents of said data storing unit are made invalid.

2. A cache memory as set forth in claim 1, built in a microprocessor in which said register is a program counter.

3. A cache memory as set forth in claim 1, built in a microprocessor in which said register is a stack pointer.

4. A cache memory as set forth in claim 1, wherein a plurality of address information storing units and data storing units are provided, and further comprising a controlling means for controlling rewriting value in any of said plurality of address information storing units when the data to be accessed is not stored in said plurality of data storing units.

5. A cache memory as set forth in claim 4, built in a microprocessor in which said register is a program counter.

6. A cache memory as set forth in claim 4, built in a microprocessor in which said register is a stack pointer.

7. A cache memory built in a microprocessor having access to an external memory, comprising:

a register for storing a value used by said microprocessor as an address to access said external memory;

an address information storing unit for storing value of the high-order digits of said address;

a data storing unit for registering data of said external memory defined by an address range including the value stored in said address information storing unit;

a decoder which decodes the low-order digits of the value stored in said register for obtaining the storing address of each data in said data storing unit;

offset registering means for, when a branch destination address of a branch instruction is registered in said address information storing unit, registering an offset of said branch destination address;

a subtracter which subtracts the offset registered in said offset registering means from the value of said register; and agreement detecting means for, at instruction fetching, detecting agreement of the high-order digits of the subtraction result of said subtracter and the value of said address information storing unit;

wherein when agreement is detected by said agreement detecting means, the data stored in said data storing unit is accessed, and when disagreement is detected by said agreement detecting means, said external memory is accessed, the value of said address information storing unit is updated in accordance with the value of said register, and the contents of said data storing unit are made invalid.

8. A cache memory as set forth in claim 7, built in a microprocessor in which said register is a program counter.

9. A cache memory as set forth in claim 7, built in a microprocessor in which said register is a stack pointer.

* * * * *